United States Patent
Wakabayashi et al.

[11] Patent Number: 5,317,468
[45] Date of Patent: May 31, 1994

[54] MAGNETIC DISK HAVING RESERVE SERVO SECTORS AND PLURAL RESERVE TRACKS

[75] Inventors: Noriaki Wakabayashi; Tsukasa Yoshiura, both of Osaka, Japan

[73] Assignee: Matsushita Electric Industrial Co., Ltd., Osaka, Japan

[21] Appl. No.: 820,242

[22] Filed: Jan. 14, 1992

[30] Foreign Application Priority Data

Jan. 16, 1991 [JP] Japan .................. 3-003187

[51] Int. Cl.[5] .............................................. G11B 5/82
[52] U.S. Cl. .................................................... 360/135
[58] Field of Search .............. 360/77.08, 78.08, 78.14, 360/135, 133

[56] References Cited

U.S. PATENT DOCUMENTS

| | | | |
|---|---|---|---|
| 3,731,177 | 5/1973 | Commander et al. | 318/603 |
| 4,032,984 | 6/1977 | Kaser et al. | 360/77 |
| 4,400,747 | 8/1983 | Siverling | 360/77.08 |
| 4,783,705 | 11/1988 | Moon | 360/77.08 |
| 4,949,202 | 8/1990 | Kim | 360/78.14 |
| 5,187,619 | 2/1993 | Sidman | 360/77.08 |

FOREIGN PATENT DOCUMENTS

| | | |
|---|---|---|
| 0121145 | 10/1984 | European Pat. Off. . |
| 0321942 | 6/1989 | European Pat. Off. . |
| 54-45113 | 4/1979 | Japan . |
| 63-173282 | 7/1988 | Japan . |
| 1100777 | 4/1989 | Japan . |

Primary Examiner—A. J. Heinz
Attorney, Agent, or Firm—Willian Brinks Hofer Gilson & Lione

[57] ABSTRACT

Plural reserve servo sectors are provided to the outside of the outside and inside circumferences of the data recording track area of a sector servo type magnetic disk. Plural reserve tracks are likewise provided in this area. Using these reserve servo sectors and tracks, the position of the magnetic head is recognized even if the head skips outside the data recording track area due to magnetic head overshoot during track access, and seek errors are quickly determined and the disk re-accessed if the magnetic head is positioned in the reserve track due to a seek error or other cause. Sectors to which data relating to the protection of the magnetic disk itself or to the data files written to the data recording track area of the disk are also provided in the reserve tracks, and these sectors are referenced for data protection.

4 Claims, 5 Drawing Sheets

MAGNETIC DISK HAVING RESERVE SERVO SECTORS AND PLURAL RESERVE TRACKS

BACKGROUND OF THE INVENTION

The present invention relates to a magnetic disk and a magnetic disk device for reading and writing data, and specifically to a magnetic disk with a special format providing reserve servo sectors and reserve tracks, and to a magnetic disk device which uses this magnetic disk for improved track access performance and data protection functions.

Magnetic disk devices have become widely used in primary data storage systems due to their ability to store large volumes of data and to randomly access this data at high speed. Furthermore, unlike tape drive devices, high speed data access can be implemented because the data is recorded to plural concentric data recording tracks on the surface of the disk platter.

Many common hard disk devices today comprise plural circular hard disk platters, produced by forming a magnetic film on an aluminum or glass substrate, assembled on a common spindle in a disk assembly, a head carriage assembly of plural magnetic heads providing one magnetic head for each surface of the disk platters, and a positioning device which drives the head carriage radially to the disk platters for track access. In this hard disk device, one side of each of the stacked disks is not used for data storage, but instead is used to store the servo signal pattern required to position the head carriage. The magnetic head is thus positioned at the selected track by reading this servo signal pattern. This access control method is known as the dedicated servo method. Because the data signal recording surface and the servo signal recording surface are physically separated in this type of hard disk device, the data recording tracks and data sectors of the data signal surface can be formatted in any way. In addition, the head can be positioned at high speed to any desired track regardless of the disk format. This type of device is described in U.S. Pat. No. 3,731,177.

However, it is difficult to implement this dedicated servo method in a hard disk device having only one or two disk platters rather than plural stacked disks because it is inefficient to use one whole side for storing the servo signal pattern. In hard disk devices in which only one disk platter is used, this dedicated servo design has been replaced by a embedded servo method in which the servo signal pattern is inserted between data sectors (an extremely narrow servo sector is inserted). This method is also known as the sector servo or embedded servo method. Basically this is a hybrid design in which the servo signal patterns required for head positioning are dispersed across the data signal surface.

Flexible magnetic disk devices using a polyethylene terephthalate or similar flexible medium coated with a magnetic film as the magnetic disk are the most commonly used type of removable magnetic disk devices. These so-called "floppy" disks present a problem similar to the disk access control problem of a hard disk device with few disk platters. There have been recent attempts to develop large capacity floppy disks with a storage capacity of 10 MB or more. Such disks have a very high track density and small track pitch, thus requiring a high precision servo positioning mechanism. As a result, this sector servo design is also used on these high capacity floppy disks. An example of such a device is described in Japanese patent laid-open publication No. S63-173282.

In this sector servo method the servo signal pattern can only be detected at a constant sampling time (the scatter time) no matter where the head is located because the servo sectors are scattered between the data sectors. Therefore, the controller loses track of which track the head is crossing during track access. A method by which an absolute track number is written to the servo signal pattern as described in Japanese patent laid-open publication No. S54-45113 attempts to resolve this problem. However, with this method the servo signal pattern length increases, the servo sector length thus becomes too long and the data storage area is reduced, and the servo sector is not very resistant to defects in the magnetic film. In addition, the decoder required to interpret the absolute track number is complex.

Another sector servo method whereby all of the tracks are allocated to plural small track groups, a signal pattern or number which identifies each track in the small track group is written to the servo signal pattern, and these small track groups are repeated for the disk is also known, as described in U.S. Pat. No. 4,032,984. With this method the length of the servo sectors is reduced and the data storage area is increased, and a complicated decoder is not required.

In a sector servo-type disk device using disks in which the servo sectors have servo signal patterns by which the data recording tracks are divided into plural small track groups repeated at a regular cycle, it is possible to detect from the servo signal pattern where in the small track group the magnetic head passed during track access, but it is not possible to detect which small track group was passed. However, if the time between servo sectors, i.e., the sampling time, is reduced, the maximum track access speed is appropriately limited, and the number of tracks in each small track group is increased, and thus it is not difficult to estimate which small track group is passed at each sampling time during track access, if the track position when track access is started is known.

However, there is the possibility that a seek error causing the magnetic head to be positioned at the track of the same number or type in an adjacent small track group will occur when accessing a track in any small track group. This error will not be known until the magnetic head is positioned, the track number in the identification region at the beginning of the data sector is read, and this is referenced, but when the error is confirmed as a result of this operation a re-access is executed. However, if a seek error occurs or magnetic head overshoot occurs when accessing a small track group at the extreme outside or inside circumference of the data recording tracks, there is no way to confirm the magnetic head location because there are no tracks beyond the area being accessed. Normal servo operation cannot be applied in these areas. The normal access control sequence cannot be used to move the head from an unknown disk location, and a separate special re-access control sequence is necessary. This control sequence requires preparation of a separate microprocessor program, and results in an unavoidable and extreme drop in access speed.

This problem is particularly severe with removable floppy disk drives, and especially with high capacity floppy disk drives. Temperature and humidity can cause the flexible medium in the floppy disk to expand and contract, and there is an avoidable degree of track eccentricity resulting from loading and unloading the disk, causing the track positions to vary widely with disk speed. Because the track density is high and the track pitch is narrow, the possibility of the head being positioned in an adjacent small track group is high with large capacity floppy disks. In addition, there is also a high possibility that the magnetic head will temporarily overlap the adjacent small track group due to overshoot and track eccentricity during track access.

Furthermore, protecting the data written to the data recording tracks has become an important consideration for magnetic disks, and particularly for removable disks, but the standard floppy disk formats conventionally used do not provide for any special data protection. Therefore, irregular methods have been unavoidably used to protect the data by the disk itself. Normally, an irregular format which cannot be read by the normal disk operating system for file control is used to inhibit easy file copying and thereby protect data, but these irregular methods are not guaranteed as a way to use the disks.

In addition, the security of data stored to conventional floppy disks has conventionally been a function of the system software, and has not been protected by the disk itself.

SUMMARY OF THE INVENTION

Therefore, an object of the present invention is to provide a magnetic disk and magnetic disk device whereby a seek error or overshoot causing the magnetic head to skip past the extreme outside or inside data recording track will virtually never cause the means of recognizing the current disk location of the magnetic head to become nonfunctional, thus preventing application of normal servo control.

A further object of the invention is to provide a magnetic disk and magnetic disk device whereby the magnetic head can be repositioned at the target data recording track without using a special re-access sequence and without slowing the access speed even when accessing the small track group at the extreme outside or inside circumference of the data recording tracks.

A further object of the invention is to provide a sector servo type large capacity flexible magnetic disk and magnetic disk device comprising a servo sector format and track format optimized to achieve a high track density and high capacity with good track access performance, even when the tracks vary widely with disk rotation due to expansion and contraction of the medium with temperature and humidity or track eccentricity accompanying disk loading and unloading.

A further object of the invention is to provide a magnetic disk and magbetic disk device whereby the data written to the data recording tracks is more completely protected, particularly on a removable disk.

To achieve the aforementioned objects, a magnetic disk according to the present invention uses a sector servo control method whereby plural data recording track groups are formed on the data recording surface and servo sectors are likewise formed, dispersed over the data recording surface for positioning the magnetic head. Each servo sector contains a servo mark for detecting the servo sector and the servo signal pattern; the N magnetization reversing patterns (where N is an integer) included in the servo signal pattern enable the plural data recording tracks to be categorized into N types, and to be subdivided into small track groups of N tracks repeated at a regular cycle. Reserve servo sectors are provided outside the outside and inside circumferences of the data recording track groups to quickly recognize the magnetic head position if overshoot occurs when positioning the head at the small track group at the edge of the data recording tracks. Plural reserve tracks, which are not actually used for data storage, are also provided outside the outside and inside circumferences of the data recording track groups so that the track number in the identification area of the reserve track can be checked to quickly re-access the disk if the magnetic head is erroneously positioned in the reserve track outside the data area when accessing the small track group at the edge of the data recording tracks.

A magnetic disk device according to the present invention reads and writes the magnetic disk described above, and comprises a servo mark detection device to detect the servo marks and recognize the servo sectors, a holding device to hold at least two waveforms from among the N magnetization reversing patterns included in the servo signal pattern, a position detector to compare the waveforms of the magnetization reversing patterns obtained from this holding device to determine where in the small track group the magnetic head is positioned, a magnetic head positioning device with a maximum positioning precision of $\pm N/2$ times the track pitch of the data recording tracks selected during track access, and a controller which, when the magnetic head is erroneously positioned in the reserve track, reads the track number from the identification region of each sector in the reserve track, thus determines a seek error, and therefore outputs a re-access command.

A magnetic disk device according to an alternative embodiment of the present invention reads and writes the magnetic disk described above, and provides commands to access the reserve track and read commands for reading the sectors to which are written data relating to the protection of the magnetic disk or the data files written to the data recording tracks thereof; when there is an attempt to access or manipulate the magnetic disk or the data files written to the data recording tracks thereof, the command to access the reserve track is executed and a read command to read the sectors storing data relating to file or disk protection is executed, thus restricting access and manipulation of the magnetic disk or the data files written thereto.

When the magnetic head moves outside the extreme outside or inside circumference of the data recording tracks due to a seek error or overshoot, the reserve servo sector makes it extremely rare for the magnetic head position to be lost and normal servo control to become nonapplicable.

Next, because a reserve track is provided outside the data recording track, if the magnetic head overlaps the reserve track due to a seek error or overshoot when accessing the small track group at the outside or inside circumference of the data recording tracks, the magnetic head can be repositioned to the target data recording track without using a special re-access control sequence, and it is therefore possible to prevent any particular drop in the access rate.

In addition, because a high track density can be achieved even with floppy disks, which are subject to track eccentricity accompanying disk loading and unloading and expansion and contraction of the medium due to temperature and humidity as well as with floppy disk drives, a high capacity floppy disk can be achieved with good track access performance.

In addition, if sectors to which data relating to the protection of the disk or data files on the disk are provided in the plural reserve tracks which are not used for normal data storage, more complete data protection can be achieved with removable disk in particular.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
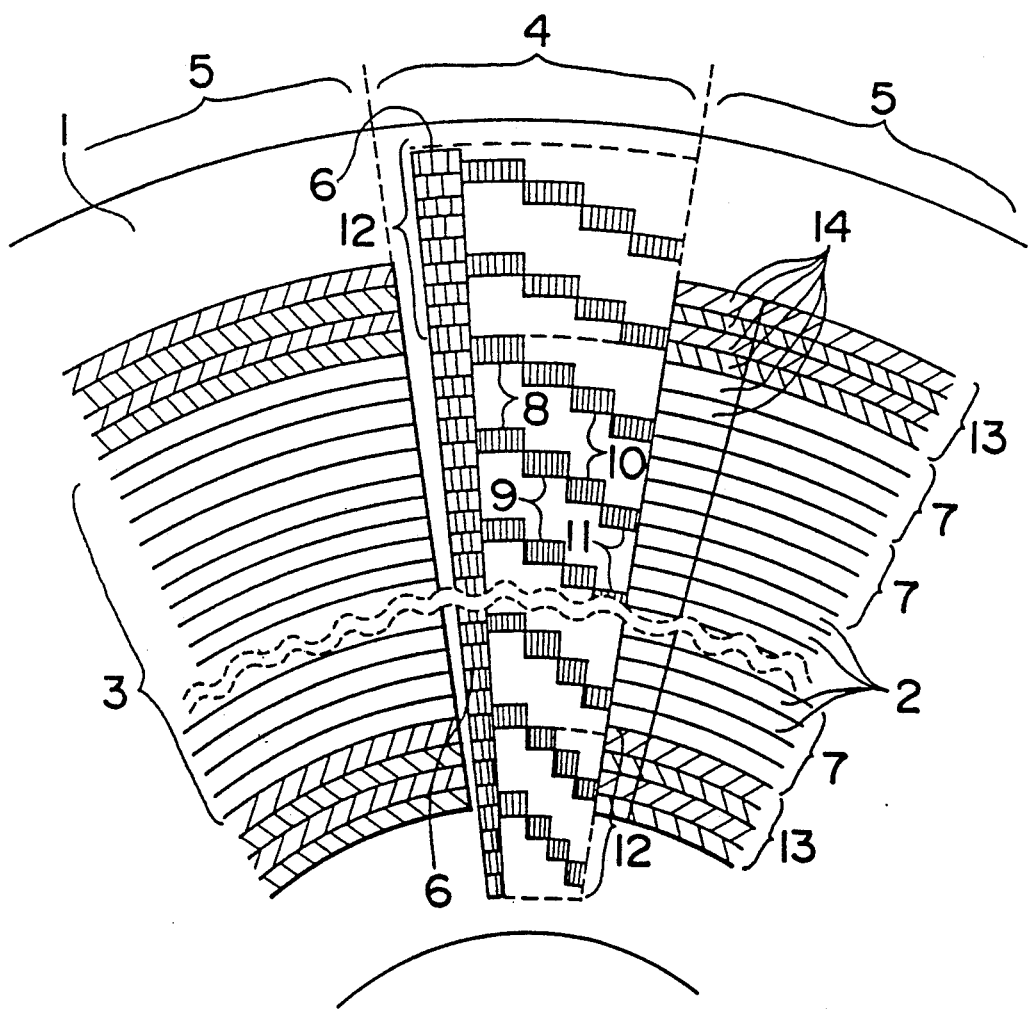
FIG. 1 is a descriptive drawing of the format on the data recording side of a magnetic disk according to the present invention.

The preferred embodiments of a magnetic disk and magnetic disk device according to the present invention are described hereinbelow with reference tot he accompanying figures. FIG. 1 is a descriptive diagram of the format of the data recording side of the magnetic disk around the servo sectors positioned at various parts of the data recording surface according to a first embodiment of the present invention. The disk 1 may be a circular aluminum or glass substrate hard disk or a polyterephthalate or similar flexible resin film medium floppy disk with a magnetic surface coating. The magnetic pattern of the format written to the disk with a magnetic head is not directly visible, but is shown in FIG. 1 as though it were. This format includes plural concentric data recording tracks 2 formed on the data recording surface of the disk 1; the data recording track group 3 includes the data recording tracks 2; the servo sectors 4 are spaced around the disk between the data sectors 5 of the data area for positioning the magnetic head at the selected data recording track. The servo sectors 4 comprise servo marks 6 for detecting the servo sector 4, and a servo signal pattern comprising at least N different magnetization reversing patterns 8, 9, 10, and 11 to separate the data recording tracks into N groups (where N is an integer) and subdivide the tracks into small track groups 7 at a regular cycle of N tracks. Note that N is an integer defined as 4 in this example.

A reserve servo sector 12 is provided outside the outside circumference side or the inside circumference side of the data recording track group 3 to prevent losing the magnetic head position if the drive mechanism overshoots the data area when positioning the magnetic head at the last track in the data recording track group 3. If the reserve servo sector 12 is beyond the outside or inside circumference of the data recording track, the magnetic head position can be quickly recognized even if the head is slightly outside the data recording track. Providing more reserve servo sectors 12 can enable this recognition operation to be completed faster, but it is preferable to provide a number equal to the number of tracks and at a minimum greater than the number of reserve tracks mentioned later. In this embodiment eight reserve servo sectors 12 are provided.

Plural reserve tracks 13 are likewise provided outside the outside circumference side or the inside circumference side of the data recording track group 3 to quickly detect seek errors if the magnetic head is positioned outside the outside circumference side or the inside circumference side of the data recording track group 3 when accessing the small track group at the edge of the data recording track. If the reserve servo sectors 12 are provided outside the outside circumference side or the inside circumference side of the data recording track, the magnetic head can be positioned and tracked. However, if the data sectors are not present there is no way to determine whether the correct track was accessed. The plural reserve tracks 13, which are not used for actual data storage, are therefore provided to enable quick seek error detection to re-access the correct track. A certain number of reserve tracks 13 is needed, but because most seek errors occur from positioning the magnetic head at the adjacent small track group, the number of reserve tracks 13 should at least be equal to the number of tracks in the small track group. In this embodiment four reserve tracks 13 (N=4) are provided, i.e., the number of reserve tracks 13 equals the number of tracks in the small track group 7. The reserve servo sectors 12 are preferably positioned outside of these reserve tracks 13.

An identification area 14 is also provided at the beginning of each data sector in the data recording tracks and the reserve tracks 13 to record a code, e.g., a track number, for comparison to determine whether the track at which the magnetic head is positioned is the correct track.

Figure 2:
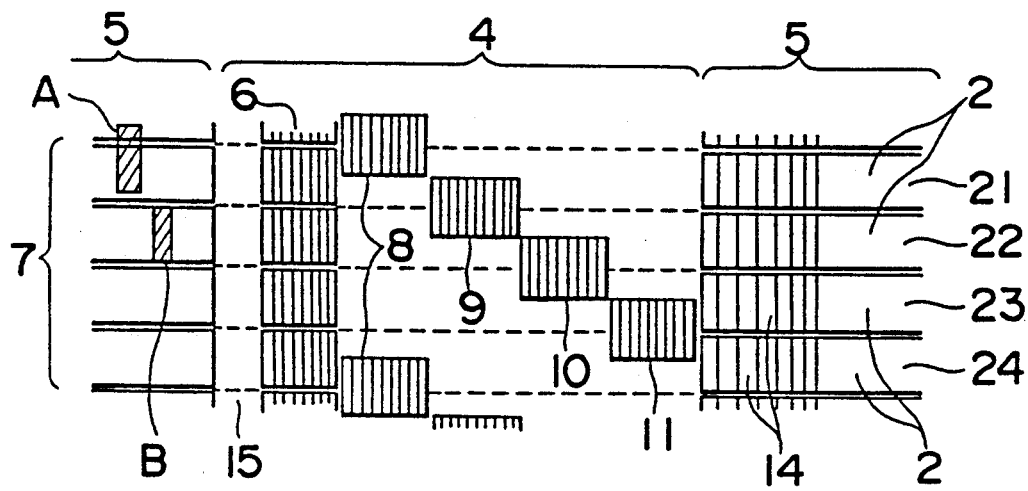
FIG. 2 is an expanded view of the area near the servo sector in the small track group of a magnetic disk according to the present invention.

FIG. 2 is an enlarged view of the area around the servo sector of the small track group on a magnetic disk according to the present invention. It is to be noted that the track on an actual disk is an arc, but is illustrated here as a straight line. The servo sectors 4 comprise a DC erase area 15, servo marks 6, and the servo signal pattern of the four magnetization reversing patterns 8, 9, 10, and 11. The small track group 7 comprises four data recording tracks 21, 22, 23, and 24, which are positioned between magnetization reversing patterns 8 and 9, 9 and 10, 10 and 11, and 11 and 8, respectively.

Figure 3:
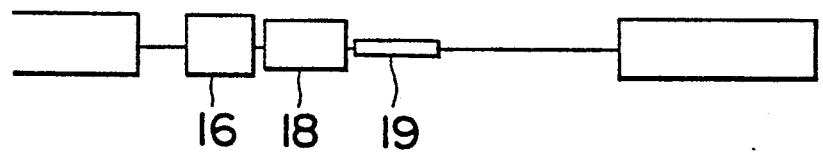
FIG. 3 is a waveform diagram of the read signal when the magnetic head is at A in the expanded view of the area near the servo sector in the small track group of a magnetic disk according to the present invention as shown in FIG. 2.

FIG. 3 is a waveform diagram of the readout signal when the magnetic head is at A in the enlarged view of the area near the servo sector in the small track group of a magnetic disk according to the present invention as shown in FIG. 2; 16 indicates a servo mark readout waveform, 18 a readout waveform of magnetization reversing pattern 8, and 19 a readout waveform of magnetization reversing pattern 9. Because the magnetic head is off track at A slightly above the data recording track 21, the amplitude of the readout waveform 18 of the magnetization reversing pattern 8 is greater than the amplitude of the readout waveform 19 of the magnetization reversing pattern 9.

Figure 4:
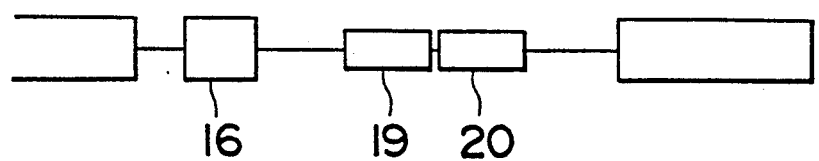
FIG. 4 is a waveform diagram of the read signal when the magnetic head is at B in the expanded view of the area near the servo sector in the small track group of a magnetic disk according to the present invention as shown in FIG. 2.

FIG. 4 is a waveform diagram of the readout signal when the magnetic head is at B in the enlarged view of the area near the servo sector in the small track group of a magnetic disk according to the present invention shown in FIG. 2; 20 is a readout waveform of magnetization reversing pattern 10. Because the magnetic head is right on track at B on the data recording track 22, the amplitude of the readout waveform 19 of the magnetization reversing pattern 9 is equal to the amplitude of the readout waveform 20 of the magnetization reversing pattern 10. In other words, to track the position of the magnetic head on the data recording track 22, it is sufficient to simply control the magnetic head so that the readout waveforms 19 and 20 for the magnetization reversing patterns 9 and 10 in the servo signal pattern are equal. Similarly, to position and track the magnetic head along data recording track 21, it is sufficient to simply control the magnetic head so that the readout waveforms 18 and 19 for the magnetization reversing patterns 8 and 9 in the servo signal pattern are equal. Similarly, to position and track the magnetic head along data recording track 23, it is sufficient to simply control the magnetic head so that the readout waveforms for the magnetization reversing patterns 10 and 11 in the servo signal pattern are equal, and to position and track the magnetic head along data recording track 24, it is sufficient to simply control the magnetic head so that the readout waveforms for the magnetization reversing patterns 11 and 8 in the servo signal pattern are equal.

As will be known from the above description, if there are N data recording tracks in the small track group, these can be individually distinguised by providing N magnetization reversing patterns in the servo signal pattern. However, it is preferable that the number of magnetization reversing patterns or the value of N be greater than three. If there were only two different magnetization reversing patterns, the position of the data recording track will be between the patterns and it will be difficult to distinguish them and to determine the direction in which the head must be moved. If there are at least three magnetization reversing patterns, identified, for example, as Pa, Pb, and Pc, the tracks can be distinguished if the first is between Pa and Pb, the second between Pb and Pc, and the third between Pc and Pa, and the direction of magnetic head travel can be easily identified. The servo signal pattern of the first embodiment described with reference to FIGS. 1 and 2 includes four magnetization reversing patterns, but the invention shall not be so limited and the same effect can be obtained if there are at least three patterns.

Figure 5:
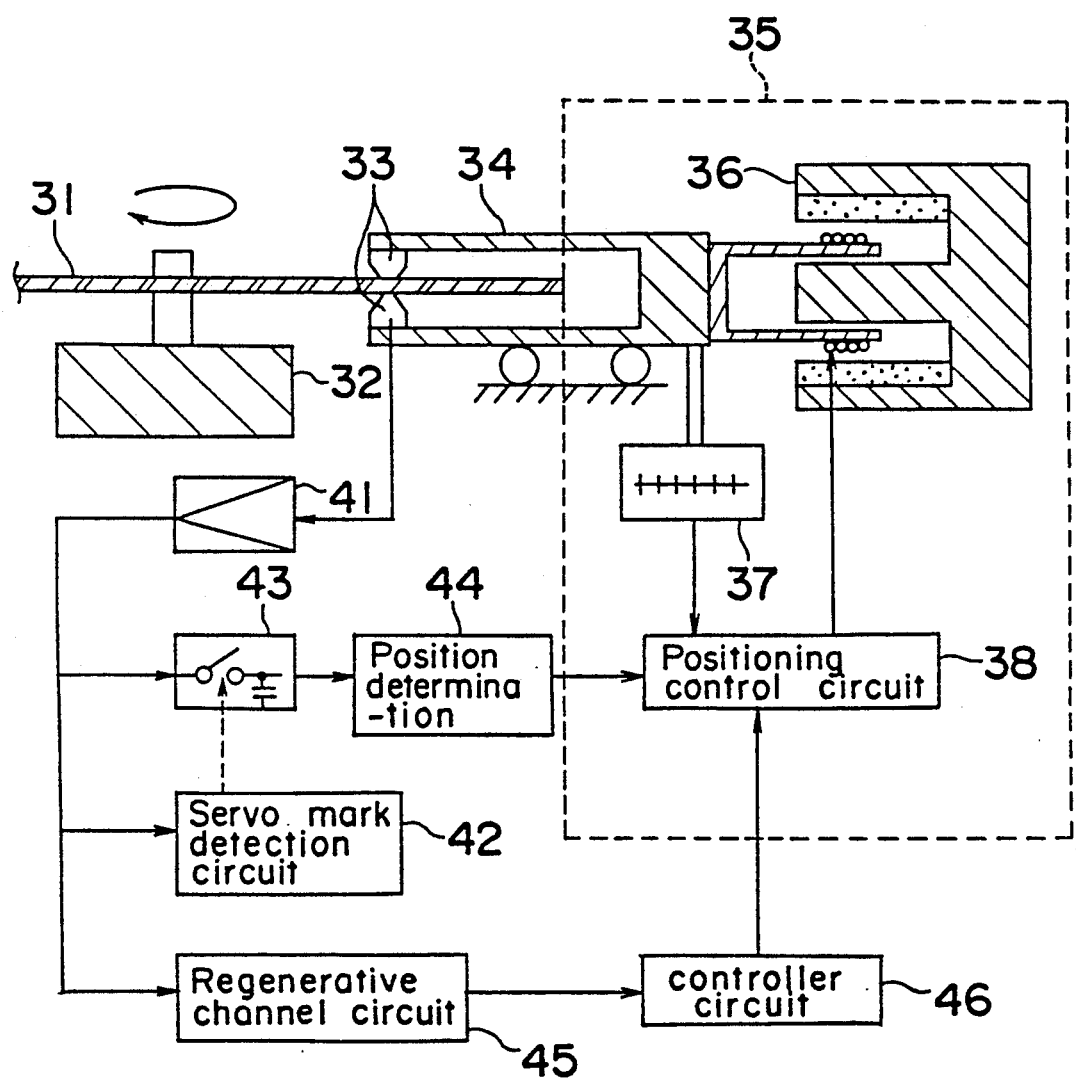
FIG. 5 is a block diagram of a magnetic disk device according to the present invention.

FIG. 5 is a block diagram of a magnetic disk device according to a first embodiment of the present invention. For simplification, a single magnetic disk 31 is used in this magnetic disk device, which comprises a spindle motor 32 to drive the magnetic disk 31, magnetic heads 33, a carriage 34 on which the magnetic heads 33 are mounted and the position of which is controlled by a positioning device 35, a voice coil motor (VCM) 36 which functions as the positioning mechanism of the positioning device 35 to drive the magnetic heads 33 and carriage 34, and a positioning encoder 37, also in the positioning device 35, to detect the movement of the magnetic heads 33 and the carriage 34. The magnetic head is moved for track-to-track access based on the positioning encoder 37. A positioning control circuit 38 obtains signals from the positioning encoder 37, a position determination circuit described hereinafter, and the controller to supply a drive current to the VCM. This positioning control circuit 38 includes a microprocessor and VCM drive circuit.

An amplifier 41 amplifies the readout signals from the magnetic heads 33. The servo mark detection circuit 42 detects the servo marks in the servo sector to detect the servo sector from the readout signal. The servo mark detection circuit 42 generates a timing signal to simultaneously hold at least two waveforms from the magnetization reversing patterns in the servo signal pattern. The hold circuit 43 is controlled by the timing signal and holds at least two waveforms from the magnetization reversing patterns in the servo signal pattern. Normally, the waveform of the magnetization reversing pattern is a burst pattern waveform of a specific frequency; full wave rectification is applied and the peak value of the wave is sampled and held. In the embodiment shown in FIG. 2, only two of the magnetization reversing patterns 8, 9, 10, and 11 can be held at one time. The held values of the other two waves are zero. A position determination circuit 44 compares the peak values of the two magnetization reversing pattern waveforms obtained from the hold circuit 43 to determine where in the small track group the magnetic head is positioned. The relative position signal of the head to the track obtained from the position determination circuit 44 is then input to the positioning control circuit 38.

If the positioning device 35 can utilize the positioning encoder 37, the position of the magnetic head can be controlled from one side of the magnetic disk to the other, but this position is relative to the position encoder or the position encoder mounting member and not to the magnetic disk itself.

With a removable floppy disk significant deviations from the axis occur in the track due to eccentricity when the disk is loaded, temperature, humidity, and distortion of the disk media itself. The maximum positioning precision of this positioning device 35 is within $\pm N/2$ times the track pitch to the center of the selected data recording track on the magnetic disk. This is because the data recording tracks are repeated every N tracks where N is the number of servo signal patterns, and the relative position signal of the head to the track obtained from the position determination circuit 44 is a signal repeated every N tracks, thus limiting the relative position recognition to a maximum range of the track pitch times N. Relative to the center of the selected data recording track, the maximum precision is thus $\pm N/2$ times the track pitch. If the eccentricity of the track is within this range of $\pm N/2$ times the track pitch, the magnetic head is moved using the positioning encoder, and relative positioning control can be applied using the head position signal to the track obtained from the position determination circuit 44 thereafter. When track eccentricity increases, the probability of the magnetic head being positioned in the adjacent small track group increases.

The recorded data read channel circuit 45 is a conventional circuit comprising filter, pulse discrimination circuit, PLL (phase-locked loop) circuit, and encoder/decoder. The controller circuit 46 controls data read/write operations to the data sector of the data recording tracks on the magnetic disk, but also reads and references the track number in the identification area of each sector of the reserve tracks when the magnetic head is erroneously positioned in the reserve track. The controller circuit 46 thus detects seek errors, and controls the positioning control circuit 38 to re-access the disk.

Figure 6:
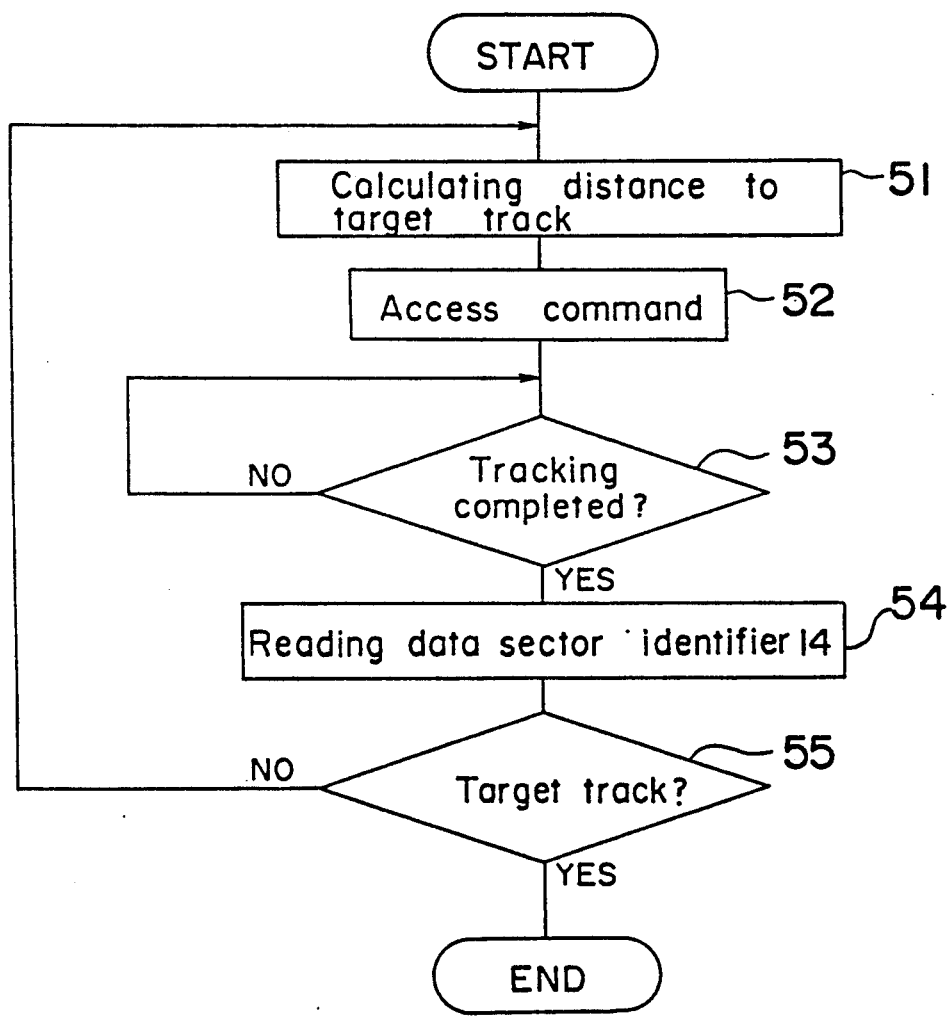
FIG. 6 is a flow chart of track access operation according to the present invention.

Fig. 6 is a flow chart of the ordinal track access operation to be executed by the magnetic disk device shown in FIG. 5. At step 51, the controller circuit 46 calculates a distance from the present track to the target track and gives an access command to the positioning controller circuit 38. When the access command is given, the positioning controller circuit 38 suspends tracking once at step 52. Then, in order to position the magnetic head 33 to the target track, the positioning controller circuit 38 drives the positioning device 35 to move the magnetic head 33 by the distance obtained at step 51 in accordance with position data, from the position encoder 37 and, thereby, the tracking operation is restarted. When completion of the tracking is confirmed at step 53, the data sector identifier 14 (see FIG. 2) is read out to identify the track after the tracking operation at step 54. Next, the track identified is compared with the target track at step 55 and, if the former coincides with the latter, the track accessing is completed. If the magnetic head is positioned to a track belonging to a small track group adjacent to the target small group including the target track due to reasons mentioned above, the processing is returned to step 51 to execute the track accessing operation again and steps from 51 to 55 are executed to position the magnetic head to the target track. Even if the track access to a track belonging to the outer-most or inner-most small track group has failed, the magnetic head 33 can be positioned to one of reserve tracks 14 formed on the disk according to the present invention. Accordingly, the track access operation to the target track can be done by reading out the data sector identifier 14 of the reserve track, when the magnetic head 33 is positioned erroneously.

Figure 7:
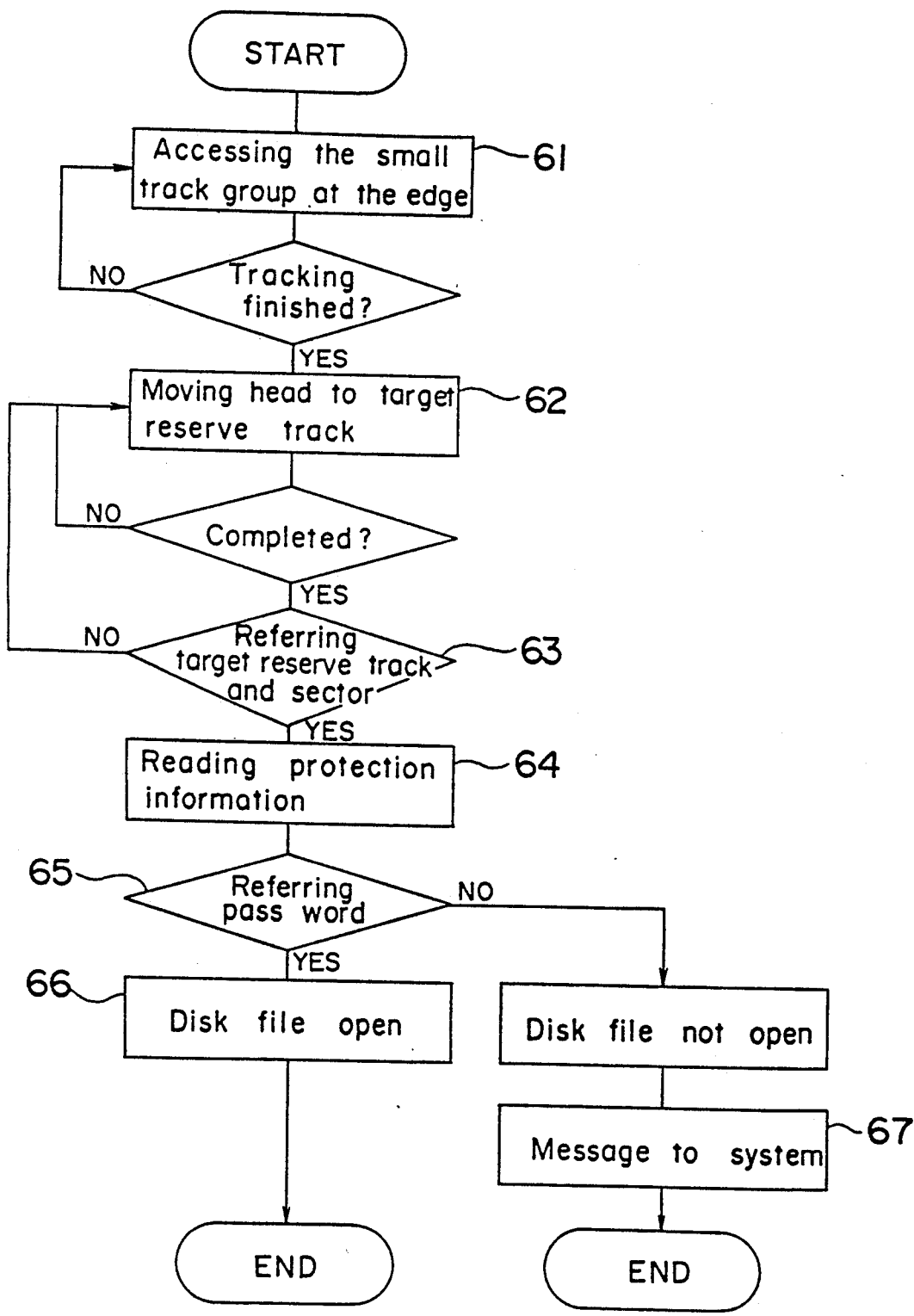
FIG. 7 is a flow chart of magnetic disk and data file protection in a magnetic disk and magnetic disk device according to the present invention.

FIG. 7 is a flow chart relating to magnetic disk and data file protection in a magnetic disk and magnetic disk device according to the present invention. This flow chart relates specifically to magnetic disk or data file access. At step 61 in the figure there is a command to access the small track group at the edge of the data recording track area before accessing the reserve track. Step 62 is a command to move the magnetic head to the target reserve track in maximum steps of one track. By thus accessing the reserve track in at least two steps, the magnetic head is prevented from moving outside the reserve track. Step 63 is the step in which the target reserve track and sector are referenced, and the identification area is thus read for reference by the controller. Once the target track and sector are found, the protection data is read, and in step 65 the password is referenced. If a match is found, disk access is allowed at step 66, or the opening of a data file is allowed and the sequence terminates. However, if a match does not result from the controller comparison, a corresponding message 67 is sent to the system and the sequence terminates. It is to be noted that while file copying, i.e., copy protection, is not discussed specifically hereinabove, copy protection can be easily implemented by using a similar reserve track.

The following effects are obtained by the present invention constructed as described hereinabove. First, when the magnetic head skips outside the extreme outside or inside circumference of the data recording track group due to a seek error or overshoot, the head position will rarely be lost because reserve servo sectors are provided. As a result, it will be extremely rare for a situation to occur in which normal tracking servo control cannot be applied.

Next, because reserve tracks are provided outside the data recording track group, even if the magnetic head overlaps the reserve track due to a seek error or overshoot when accessing the small track group at the outside or inside circumference of the data recording track group, the magnetic head can be repositioned at the target data recording track without using a special re-access control sequence, and there is no particular drop in access speed even when accessing the small track groups at the outside edges of the data area.

Furthermore, because a high track density can be achieved even with floppy disks, which are subject to track eccentricity when the disk is loaded and variations in the track resulting from disk rotation, and expansion and contraction of the media due to temperature and humidity, as well as with floppy disk drives, a high capacity floppy disk can be achieved together with good track access performance.

Moreover, if sectors to which are recorded data relating to protection of the disk itself or the data files recorded thereon are provided in the plural reserve tracks which are not used as part of the normal data storage area, more complete data protection can be provided for removable disks in particular.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sector servo type magnetic disk having plural data recording tracks forming plural data recording track groups formed on a data recording surface, and servo sectors spaced at intermittent locations on the same data recording surface for head positioning, wherein each of said plural data recording track groups comprises N data recording tracks, N being determined by periodic servo marks arranged at each of said servo sectors, such that each of said data recording tracks may be individually distinguished, said magnetic disk comprising:

reserve servo sectors having servo marks and servo signal patterns for head positioning, provided outside the outside circumference and inside circumference of said plural data recording track groups; and plural reserve tracks, each having an identification area in which at least a track identification code is recorded, provided outside the outside circumference and the inside circumference of said plural data recording track groups.

2. The magnetic disk according to claim 1, wherein N reserve tracks are provided outside the outside circumference or the inside circumference of said plural data recording track groups, and the number of reserve servo sectors provided outside the outside circumference or the inside circumference of the plural data recording track groups corresponds to N or more tracks.

3. The magnetic disk according to claim 1, wherein N reserve tracks are provided outside both the outside circumference and the inside circumference of said plural data recording track groups, greater than N reserve servo sectors are provided at both the outside circumference and outside the inside circumference of said plural data recording track groups, and the integer N equals or is greater than 3.

4. The magnetic disk according to claim 1, wherein said plural reserve tracks include at least one sector in which data used to protect data files written to the plural data recording tracks of the magnetic disk is recorded.

* * * * *